US012226274B2

(12) United States Patent
Fishman et al.

(10) Patent No.: US 12,226,274 B2
(45) Date of Patent: Feb. 18, 2025

(54) PIVOTING BRUSH HEAD APPARATUS AND SYSTEM FOR CLEANING TEETH AND METHODS FOR MANUFACTURING THEREOF

(71) Applicant: SWIV LLC, Philadelphia, PA (US)

(72) Inventors: Victoria N. Fishman, Philadelphia, PA (US); Kevin R. Paroda, State College, PA (US); Jenna L. Borges, San Mateo, CA (US)

(73) Assignee: SWIV LLC, Highland Park, IL (US)

( * ) Notice: Subject to any disclaimer, the term of this patent is extended or adjusted under 35 U.S.C. 154(b) by 0 days.

(21) Appl. No.: 18/384,229

(22) Filed: Oct. 26, 2023

(65) Prior Publication Data

US 2024/0164882 A1 May 23, 2024

Related U.S. Application Data

(63) Continuation of application No. 17/025,366, filed on Sep. 18, 2020, now abandoned.

(60) Provisional application No. 62/902,547, filed on Sep. 19, 2019.

(51) Int. Cl.
*A61C 17/20* (2006.01)
*A46B 5/00* (2006.01)

(52) U.S. Cl.
CPC ............ *A61C 17/20* (2013.01); *A46B 5/0095* (2013.01); *A46B 5/0012* (2013.01); *A46B 2200/1066* (2013.01)

(58) Field of Classification Search
CPC ... A61C 17/0202; A61C 17/028; A61C 17/20; A46D 3/00; A46B 9/04; A46B 2200/1066; A46B 5/0095; A46B 5/0012
USPC ........................................................ 15/167.2
See application file for complete search history.

(56) References Cited

U.S. PATENT DOCUMENTS

| | | | | |
|---|---|---|---|---|
| 4,224,710 | A | 9/1980 | Solow | |
| 6,381,794 | B1 * | 5/2002 | Porper | A61C 17/34 15/22.1 |
| 7,761,947 | B2 | 7/2010 | Blaustein et al. | |
| 8,176,590 | B1 | 5/2012 | Brar | |
| 8,887,338 | B1 | 11/2014 | Brar | |
| 9,198,505 | B1 | 12/2015 | Brar | |
| 2011/0308024 | A1 * | 12/2011 | Hegemann | A46B 5/0012 15/22.1 |

(Continued)

FOREIGN PATENT DOCUMENTS

| | | |
|---|---|---|
| EP | 0611282 | 8/1994 |

*Primary Examiner* — Katina N. Henson
(74) *Attorney, Agent, or Firm* — Patzik, Frank & Samotny Ltd.

(57) ABSTRACT

A toothbrush apparatus and system designed to simplify the cleaning of all surfaces of the teeth, by simplifying the brushing process to a single motion performed on the top and bottom rows of teeth, and thereby by reducing the cognitive difficulty of learning the brushing task. Simplification is accomplished by using a unique brush head that wraps around the teeth to cover the inside, top, and outer surface of the teeth at once, while a pivot mechanism with a restorative force component attaches the brush head to the brush stem, and allows the brush head to rotate about itself. These two elements combine to allow the brush head to glide around the teeth like a train on a track as the brush is moved around the mouth.

19 Claims, 8 Drawing Sheets

(56) References Cited

U.S. PATENT DOCUMENTS

| | | | |
|---|---|---|---|
| 2012/0005848 | A1 | 1/2012 | Zeng |
| 2020/0077875 | A1 | 3/2020 | Packouz et al. |

* cited by examiner

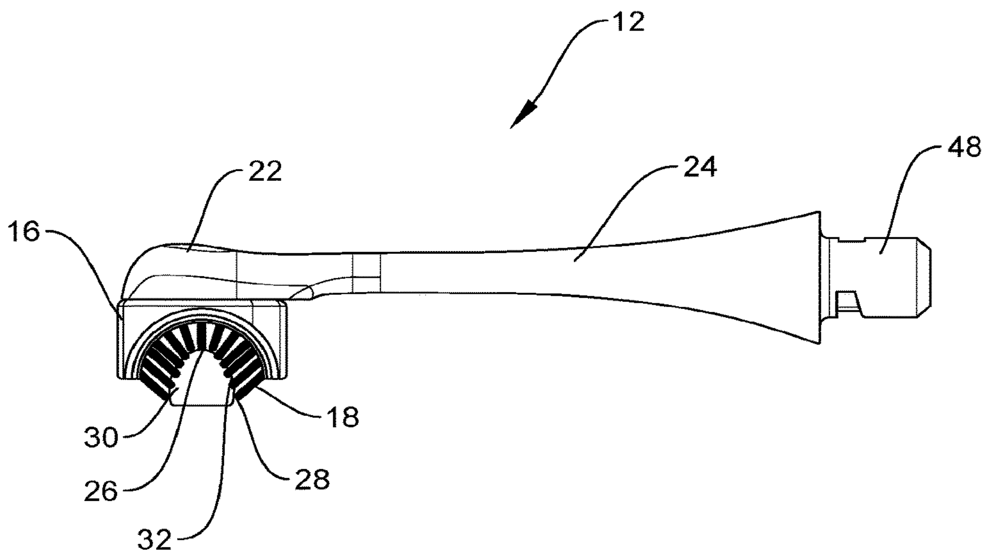
FIG. 4
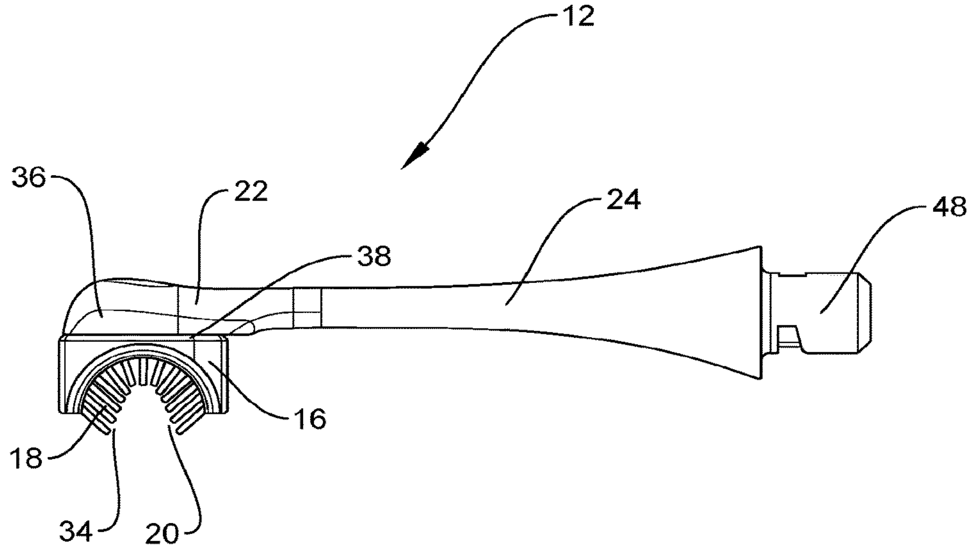
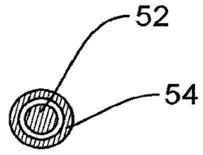
FIG. 5
FIG. 6

PIVOTING BRUSH HEAD APPARATUS AND SYSTEM FOR CLEANING TEETH AND METHODS FOR MANUFACTURING THEREOF

PRIORITY STATEMENT

The present application is a continuation of U.S. Non-Provisional patent application Ser. No. 17/025,366 filed Sep. 18, 2020, which claims the benefit of U.S. Provisional Patent Application No. 62/902,547 filed Sep. 19, 2019 and titled PIVOTING BRUSH HEAD APPARATUS AND SYSTEM FOR CLEANING TEETH AND METHODS FOR MANUFACTURING THEREOF, all of which are hereby incorporated by reference in their entirety as though fully set forth herein.

TECHNICAL FIELD

The present disclosure pertains to a toothbrush for daily cleaning of teeth, and in particular, the present disclosure pertains to a teeth cleaning apparatus comprising a pivoting brush head that wraps around the teeth to be cleaned and utilizes a restorative force, thereby allowing the brush head to glide around the teeth like a train on a track as the toothbrush and brush head is moved around the user's mouth.

BACKGROUND OF THE DISCLOSURE

Brushing one's teeth with a standard (manual or electric) toothbrush is a complex process that involves many steps in order to effectively clean all of the surfaces of all of the teeth. For individuals with motor challenges and learning challenges, it is especially difficult to execute the motions and procedural steps required for effective tooth brushing.

In order to reach all areas of the mouth, several wrist and hand manipulations are required. Common teaching methods recommended by dentists involve breaking the mouth into four quadrants or seven different regions to clean, making the brushing process many steps to keep track of. Consequently, due to the physical and cognitive complexity, many individuals do not effectively brush all of their teeth. Oral health, however, is linked to social-emotional health as well as overall physical health, making it very important.

A number of varying methods have been previously developed to either simplify this complex process or make the process easier to execute, including the use of timers, both countertop and those built into toothbrushes, as well as different shaped and size toothbrushes. Several other prior art patents recognize the advantage of toothbrushes that make brushing teeth easier with designs that allow the bristles to simultaneously cover all the surfaces of the teeth at specified angles.

U.S. Pat. No. 7,761,947, titled Complex Motion Toothbrush, pertains to an electrically driven toothbrush. In an embodiment, the toothbrush includes a handle at a first end of the toothbrush and a head at a second end of the toothbrush. The toothbrush also includes a rotatable shaft extending from the handle to the head and having a first longitudinal central axis, a first bristle holder mounted with a first pivot or hinge to the head and associated with a remote end cam or gear tooth of the shaft, the remote end, cam or gear tooth of the shaft being received in a slot of the first bristle holder for driving the first bristle holder in pivoting vibratory movement. Additionally, the toothbrush also includes a second bristle holder movably mounted to the head section and drivingly engaged by a rigidly mounted portion of the first bristle holder.

U.S. Pat. Nos. 8,176,590, 8,887,338 and 9,198,505, all titled Oscillating Toothbrush, pertain to dental care devices, systems and methods for cleaning teeth and oral tissue, which comprises an oscillating toothbrush with dual opposing brush heads, adapted to clean teeth and sulcus area. The devices are capable of brushing a set of opposing upper and lower teeth of the mouth simultaneously. The devices once inserted and positioned into the mouth to clean a pair or a set of opposing upper and lower teeth, can be maneuvered inside the mouth cavity from one side of the mouth to the other to clean all the teeth without requiring removal from the mouth and repositioning.

U.S. Pat. No. 4,224,710, titled Toothbrush For The Whole Mouth, pertains to a power-actuated toothbrush that brushes both sides of a tooth and penetrates into the embrasures. The bristles extend at an angle to the sides of the teeth whereby the bristles of the brush also enter and clean the sulcus area. In preferred embodiments of the disclosure, the biting surfaces of the teeth are cleaned simultaneously with the sides of the teeth. In other embodiments of the disclosure, an entire dental arch or even the entire mouth of teeth is cleaned in a single operation.

The prior art toothbrush designs have some or all of the following limitations: they are difficult to maneuver to the back of the mouth, if they pivot, they get stuck in position when contact removed from teeth, and are large or bulky and uncomfortable in the mouth.

To address these challenges and unmet needs, the present disclosure is a toothbrush that simultaneously covers all sides of the teeth, with bristles contacting the teeth and gingival margin at specified angles for effective cleaning and has a brush head that pivots and returns to center with a restorative force.

The foregoing is intended only to illustrate the present technical field and background art and should not be taken as a limitation or disavowal of claim scope.

SUMMARY OF THE DISCLOSURE

The following summary of the disclosure is included to provide a basic understanding of certain aspects and features of the disclosure. The summary is not an extensive overview of the disclosure and as such, it is not intended to particularly identify key or critical elements of the disclosure or to define or limit the scope of the disclosure. The purpose of the summary is to present certain concepts of the disclosure in a simplified form as an introduction to the Detailed Description of the Disclosure presented below.

This device is a toothbrush designed to make it simpler and easier to clean all the surfaces of the teeth. It reduces the cognitive difficulty of learning the task by simplifying the brushing process to a single motion that is performed on the top and bottom rows of teeth.

The simplified brushing process is accomplished through two unique elements on the brush. The first is a unique brush head that wraps around the teeth to cover the inside, top, and outer surface of the teeth at once. The second is a brush head pivot mechanism with a restorative force component that attaches the brush head to the brush stem, and allows the brush head to rotate about itself. These two elements combine to allow the brush head to glide around the teeth like a train on a track as the brush is moved around the mouth.

These unique toothbrush elements along with the brushing process ensure that all surfaces of the teeth are cleaned effectively without the user needing to actively remember to cover all areas of the mouth. It also changes the process of determining cleaning effectiveness from a time-based system, such as brushing for 2 minutes, to a counting based system, such as gliding the brush back and forth along each row of teeth a set number of times.

Several design functions of these two elements are the key for the system to work properly. First, the pivoting head must turn smoothly, without pinching and binding as it turns from side to side. Second, the pivot function uses a restorative force element that returns the brush head back to a neutral position when the force (from the teeth) is removed. Having the pivot spring back to a center position, for example, is crucial for allowing the brush head to sweep smoothly around the mouth.

Tests were performed on the experimental brush with a variety of users to prove its effectiveness. Users ranged in ages from 4 to 26, and came from a variety of backgrounds and physical and cognitive ability levels. By using the novel toothbrush, users showed an improvement in brushing technique and outcome within about a week of use.

Additional objectives and advantages of the present disclosure will become apparent to one having ordinary skill in the art after reading the specification in light of the drawing figures, however, the spirit and scope of the present disclosure should not be limited to the description of the embodiments contained herein.

DESCRIPTION OF THE DRAWINGS

FIG. 4 shows the toothbrush bristles of a pivoting toothbrush with a restorative force fully in contact with a tooth in accordance with the present disclosure.

FIG. 5 shows the toothbrush stem subassembly of a pivoting toothbrush with a restorative force in accordance with the present disclosure.

FIG. 6 shows the concentric electrical contacts in the cross-section of the toothbrush stem of a pivoting toothbrush with a restorative force in accordance with the present disclosure.

DETAILED DESCRIPTION OF THE DISCLOSURE

As stated herein, the objective of the present disclosure is to provide an improved toothbrush apparatus, and an improved toothbrush system, along with improved methods for manufacturing the improved toothbrush and toothbrush system.

Figure 12:
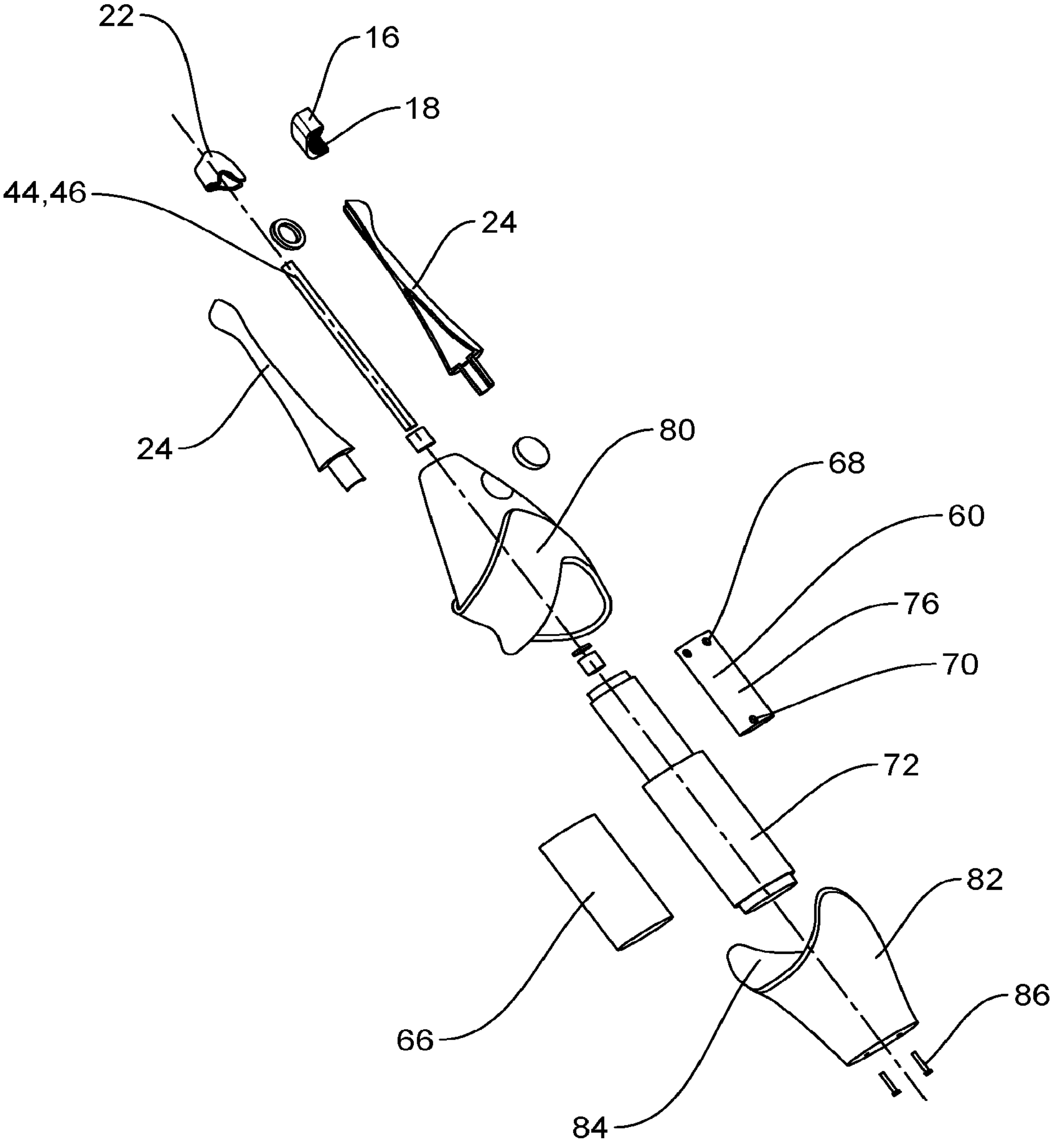
Figure 13:
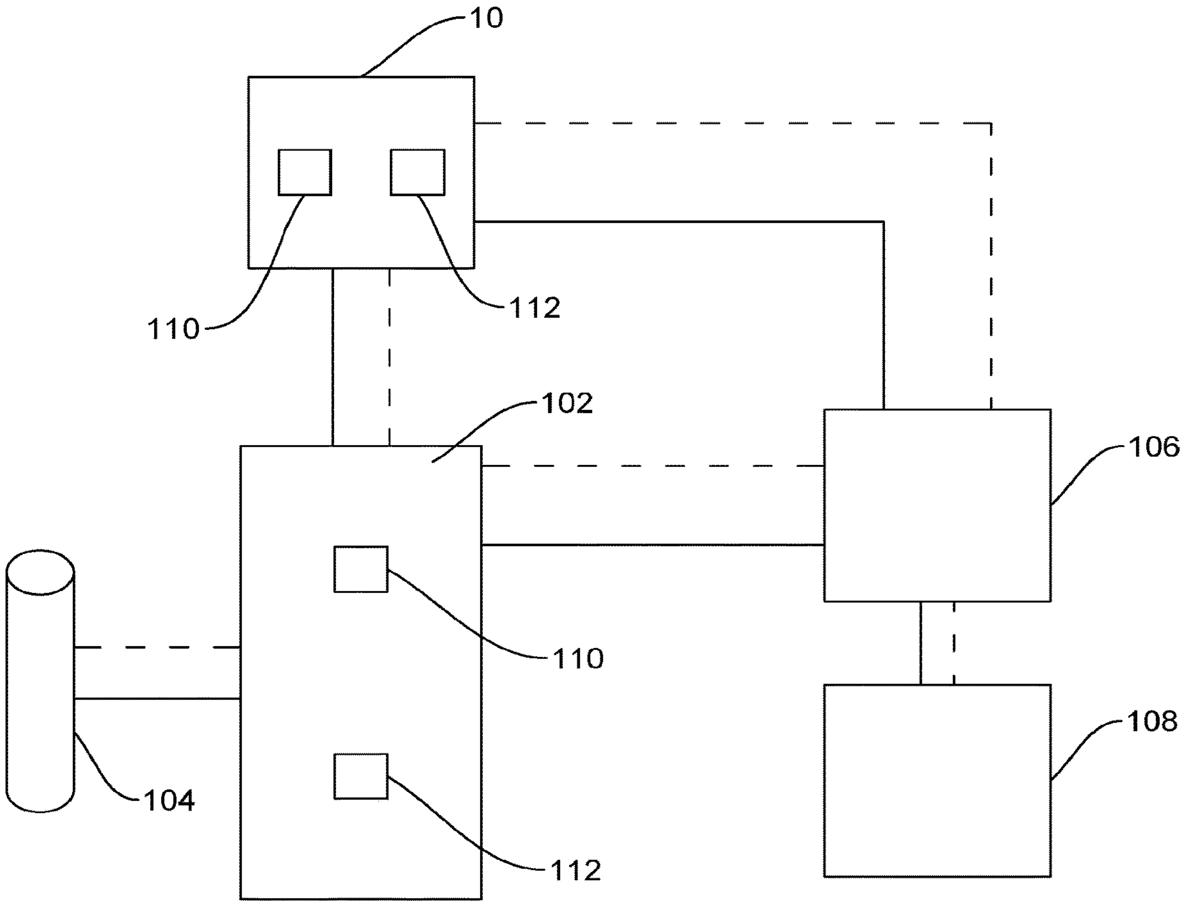
FIG. 13 shows a functional block diagram of a pivoting toothbrush with a restorative force in accordance with the present disclosure.

Referring to the drawings, wherein like reference numerals refer to the same or similar features in the various views, FIGS. 1 through 12 show different views of the improved toothbrush apparatus. FIG. 13 shows a functional block diagram of the improved toothbrush apparatus.

Figure 1:
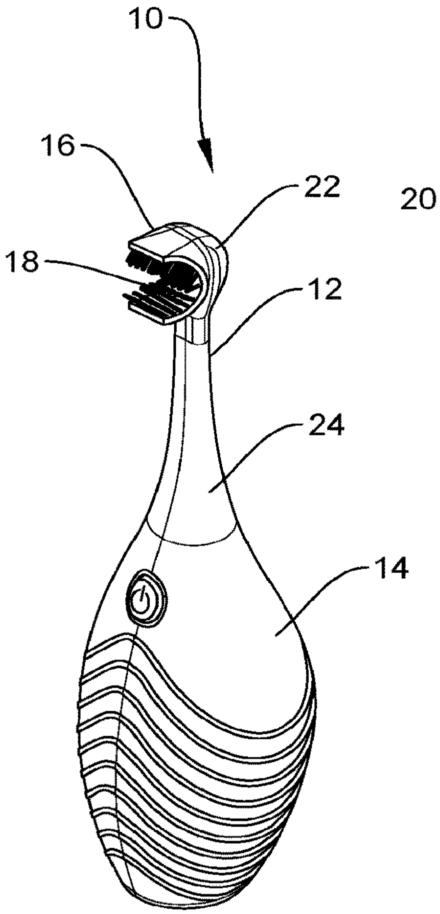
FIG. 1 shows a perspective view of a pivoting toothbrush with a restorative force in accordance with the present disclosure.
Figure 2:
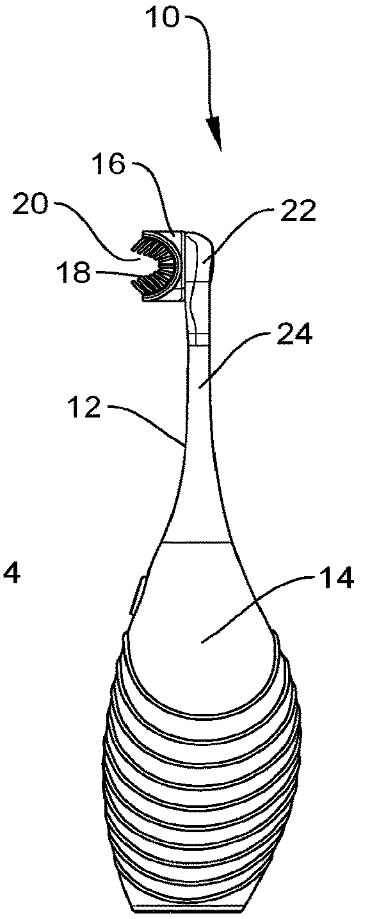
FIG. 2 shows a side view of a pivoting toothbrush with a restorative force in accordance with the present disclosure.
Figure 3:
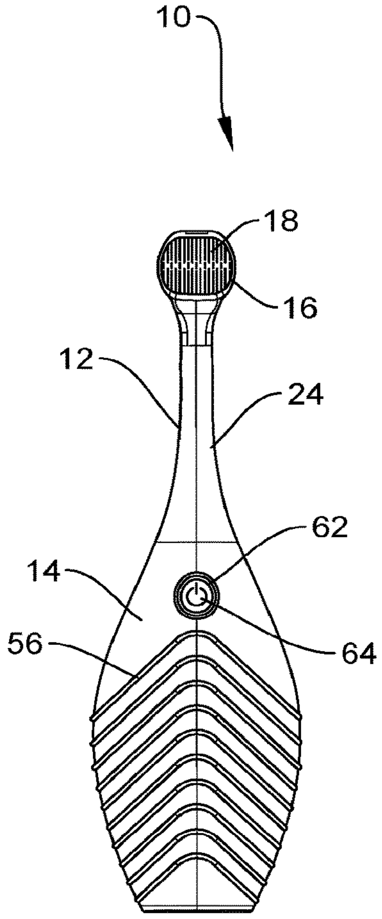
FIG. 3 shows a front view of a pivoting toothbrush with a restorative force in accordance with the present disclosure.

FIGS. 1-3 show the preferred embodiment of the toothbrush device 10 of the present disclosure. Referring to the drawings in FIGS. 1 and 2, the toothbrush device 10 comprises a toothbrush head assembly 12 and a handle 14. The toothbrush head assembly 12 comprises a toothbrush head or brush head 16 that contains bristles 18, usually either elastomer or nylon bristles (although other types of bristles can be used), which cover the brush head 16 in a concave surface shape 20, along with a toothbrush cap 22 and a stem 24. The toothbrush cap 22 is located at the back of the brush head 16, and the stem 24 connects the brush head 16 to the handle 14. Additionally, the bristles 18 can mechanically adhered to the toothbrush head 16 through the manufacturing process to comprise a single unit, although the bristles 18 and brush head 16 can be separate parts or materials.

One way to achieve this combination configuration of the brush head 16 and bristles 18 is through an overmolding process, with the toothbrush head 16 as the substrate and the bristles 18 as part of the overmolded material, as understood by one having ordinary skill in the art. This manufacturing process will allow the brush head 16 and the bristles 18 to better interlock together preventing bristles 18 from inadvertent removal from the toothbrush head 16 becoming a choking hazard.

The shape 20 of the toothbrush bristles 18 enables the bristles 18 at specific angles to simultaneously brush the top 26, inside 28, and outside 30 surfaces of the user's teeth 32 when the bristles 18 contact the tooth 32, as shown in FIG. 4. The bristles on the outer edge 34 will also be angled at 45 degrees (or a similar angle) to contact the gingival margin at an effective angle.

Figure 7A:
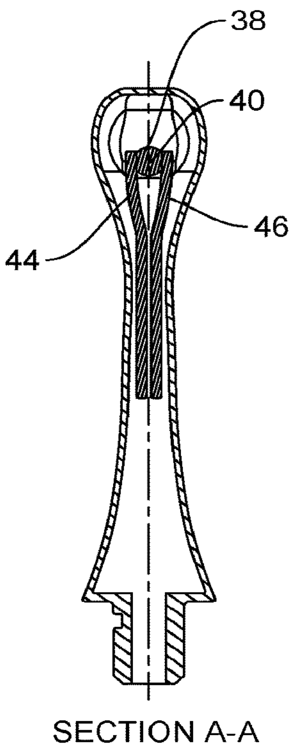
FIGS. 7A and 7B show a cross section view of the brush head and stem of a pivoting toothbrush with a restorative force in accordance with the present disclosure.
Figure 7B:
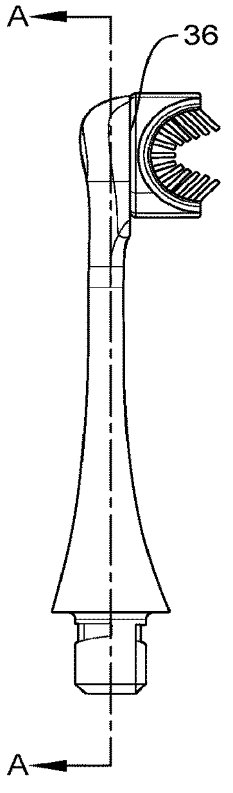
Figure 8A:
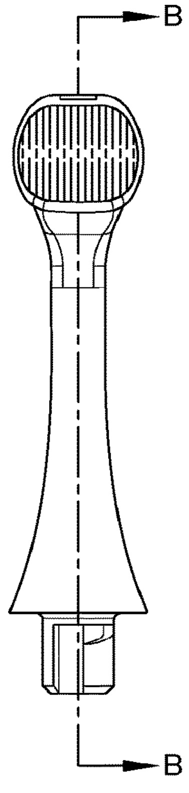
FIGS. 8A and 8B show a cross section view of the brush head and stem of a pivoting toothbrush with a restorative force in accordance with the present disclosure.
Figure 8B:
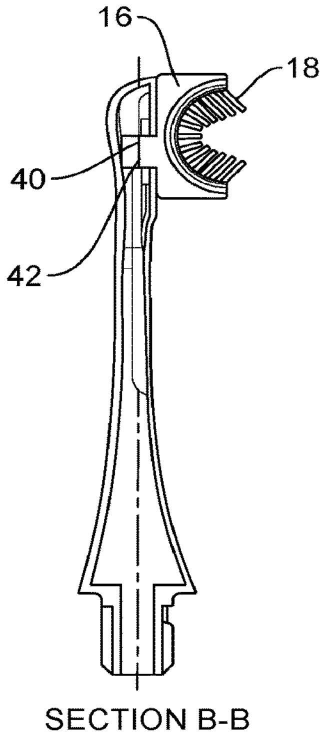

The back 36 of the brush head 16, which connects to the pivot assembly 38, has a flat surface such that it sits flush on flat surfaces of the toothbrush cap 22 and stem 24 pieces. The brush head 16 further comprises a peg 40 that extrudes from the flat surface, which is the pivot axis. The distal end of the peg 40 (end away from the bristles) has a rectangular cross section 42 to enable the pivot mechanism to function without slipping. In the preferred embodiment, the peg 40 sits between a first leaf spring 44 and a second leaf spring 46, as shown in FIG. 7A.

The pivot mechanism is core to the concept of the toothbrush device 10, facilitating the brushing process through a pivoting mechanism that allows the brush head 16 to turn and rotate relative to the handle 14. This action allows each face of the brush head 16, containing a plurality of bristles 18, to remain at an angle (such as perpendicular, etc.) to each tooth 32, independent of the angulation of the handle 14.

By simply moving the handle 14 back and forth to guide the brush head 16 around the mouth, the head 16 will follow along the axial curve formed by each tooth 32 in the mouth, scraping each tooth 32 with the plurality of bristles 18 as it goes by to facilitate proper cleaning.

Figures 9A, 9B, 9C, 9D:
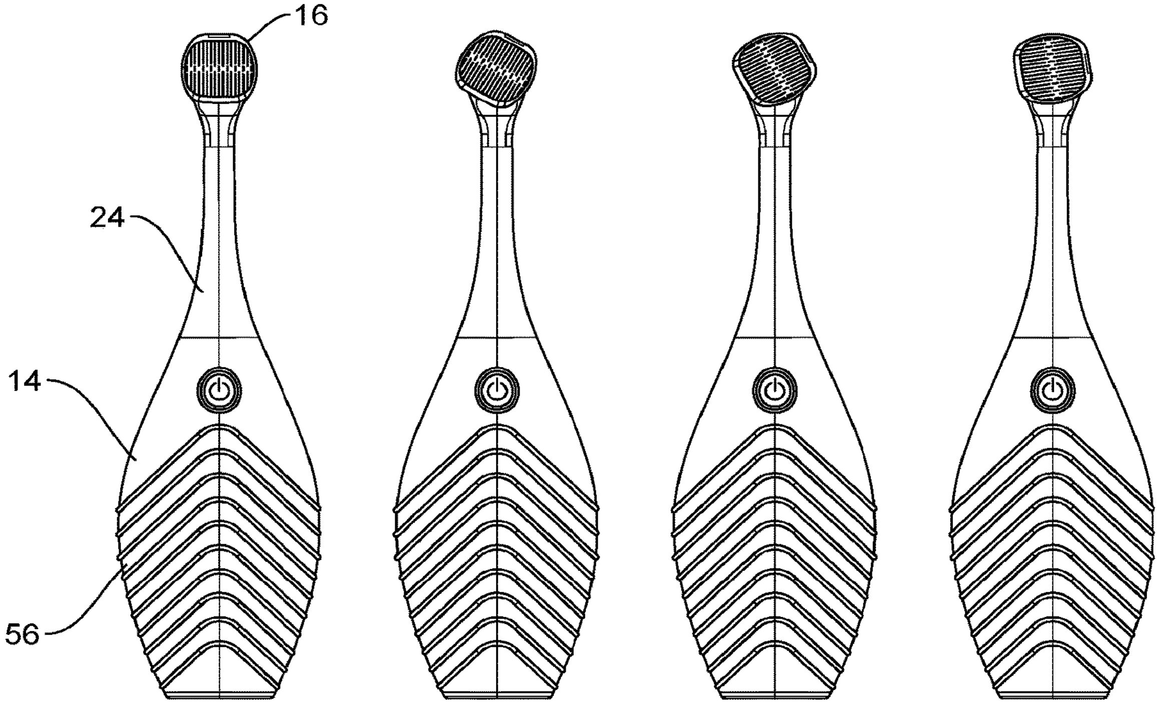
FIGS. 9A through 9D show variations in pivotal rotational position of a pivoting toothbrush with a restorative force in accordance with the present disclosure.
Figure 10A:
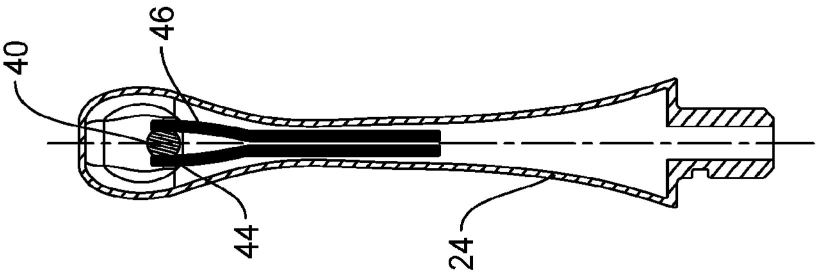
FIGS. 10A through 10E show a cross section view of the leaf spring displacement creating restorative force of a pivoting toothbrush with a restorative force in accordance with the present disclosure.
Figure 10B:
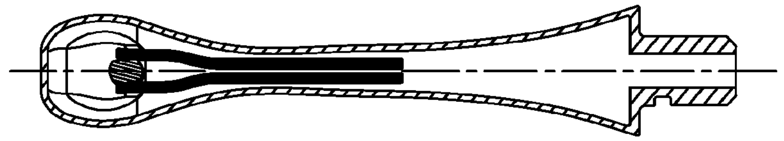
Figure 10C:
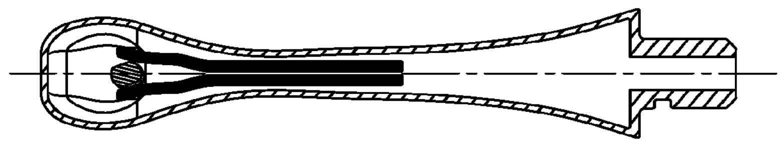
Figure 10D:
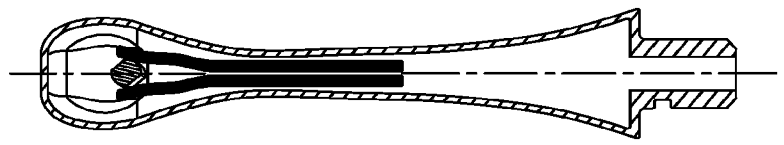
Figure 10E:
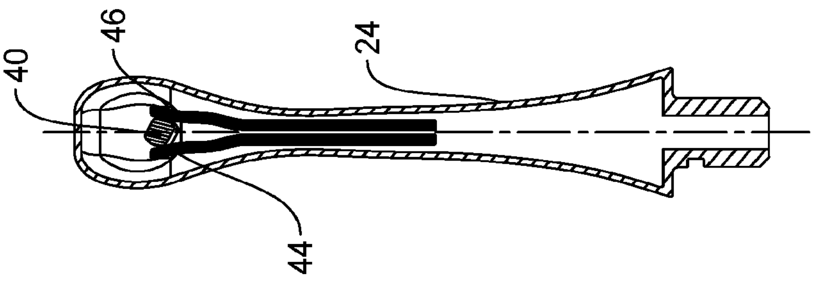
Figure 11:
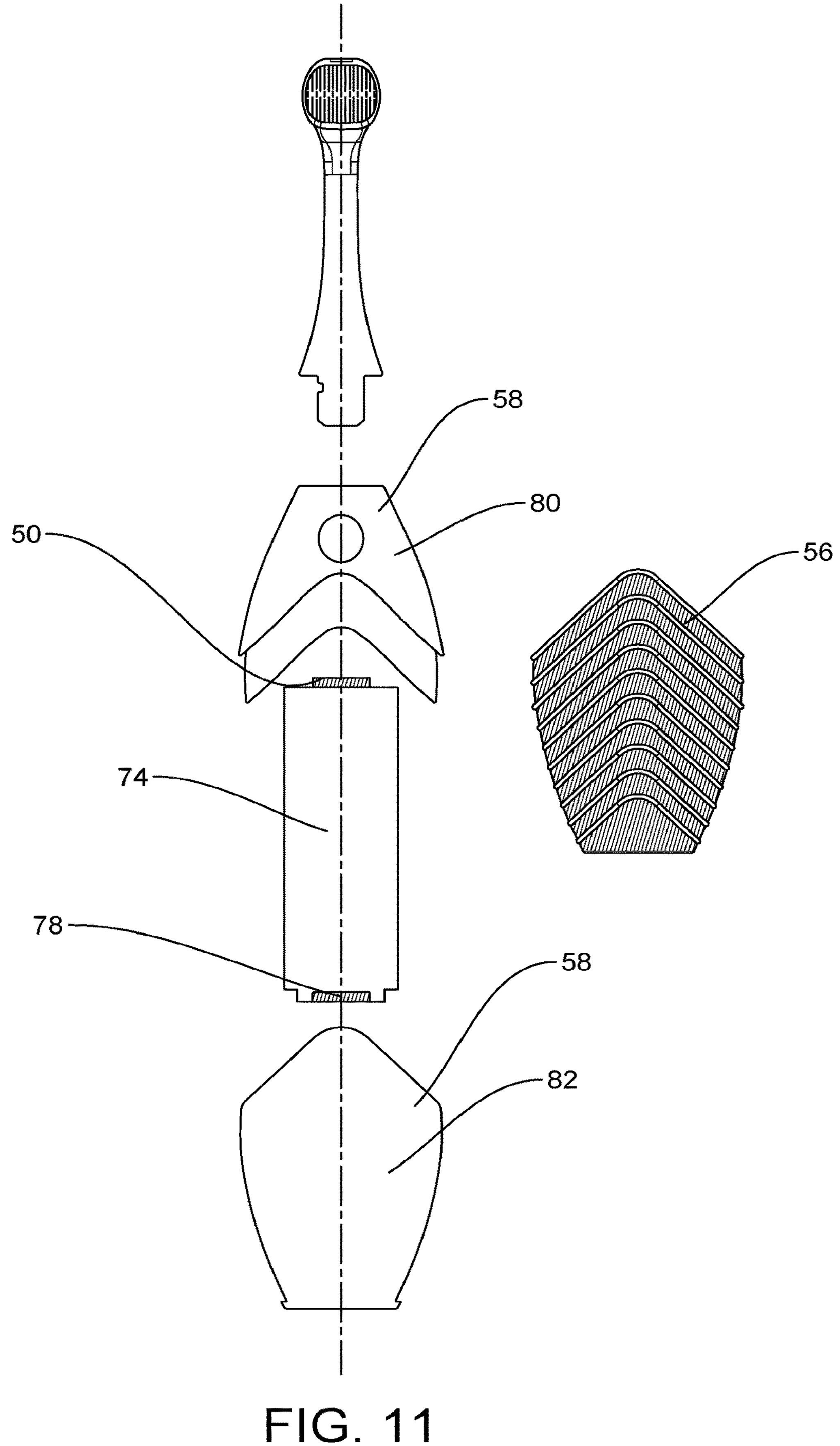
FIGS. 11 and 12 show exploded views of a pivoting toothbrush with a restorative force in accordance with the present disclosure.

FIGS. 9A through 9D illustrate the brush head 16 in different pivot positions to illustrate the motion. This pivot mechanism worked best when a restorative force was embedded in the toothbrush device 10 that caused the pivoting head 16 to return to a center neutral position, as shown in FIG. 9A. Depending on the angle of the tooth 32 in contact with the bristles 18 on the brush head 16, the brush head 16 will rotate or pivot independent of the angle of the handle 14, and placement along arc of teeth row in the mouth, as shown in FIGS. 9B, 9C and 9D.

This pivoting action can be achieved through different mechanisms, however, the preferred embodiment utilizes a first leaf spring 44 and a second leaf spring 46. The brush head 16 has a pin joint in the form of a peg 40, which sits between the first and second leaf springs 44, 46, embedded in the stem 24 of the toothbrush 10, as shown in FIG. 7A and FIGS. 10A through 10E. In the preferred embodiment, the leaf springs 44, 46 are embedded in the stem 24 and all made of one part, simplifying the manufacturing and assembly process.

As the peg 40 turns in one direction (based on the brushing action), the first leaf spring 44 on that side displaces, storing energy as a function of the amount of displacement, which is shown in FIG. 10B through 10E. This creates a restorative force that opposes the force of the pivot, helping the brush head 16 return to the neutral position when the force is released. The same applies for the pivot turning the opposite direction and for the second leaf spring 46 on the other side, allowing the brush head 16 of the toothbrush 10 to function the same on either side of the mouth.

The pivot mechanism with the ability to return to the neutral position using a restorative force is beneficial because it helps the brush head 16 rotate smoothly around the path of each tooth 32 instead of catching, snagging, or slowing down due to friction. Additionally, the brush head 16 returns to the neutral position when the brush head 16 and bristles 18 lose contact with the teeth 32, or is lifted (and lose contact) from the teeth. This enables the user to continue to brush without having to manually adjust the toothbrush head 16 like existing designs.

As described above, there are other embodiments, both mechanical and electrical, that achieve a similar pivoting action with the restorative force in accordance with the present disclosure. An alternative embodiment is a toothbrush device 10 that includes rubber bands or torsion springs, for example. These would be mounted so that the neutral position of the restorative force element would be positioned axially through the center of the pivot relative to the length of the brush.

Another alternative embodiment achieves a similar restorative force electronically through the combination of a sensor, such as a potentiometer, to measure displacement of the brush head 16 and a motor to actuate the pivot. The sensor would track how far from center the pivot has moved, and scale the force applied by the motor back in the opposite direction relative to the total displacement.

FIG. 5 shows the brush head assembly 12, which consists of the brush head 16, along with the cap 22 and stem 24. The brush head assembly 12 is detachable from the toothbrush handle 14. This ability to detach enables the brush head assembly 12 to be replaced when the bristles 18 wear out or if the brush head 16 malfunctions. A connecting mechanism 48 located at the end of the stem 24 connects to a receiving mechanism 50 in the toothbrush handle 14 (see FIG. 11) to securely attach the brush head assembly 12 to the handle 14.

A bayonet mechanism 48 can be implemented, as commonly used in power and electric toothbrushes, to achieve this result. FIG. 6 shows an inner circular, concentric conductive metal contact 52 and an outer circular, concentric conductive metal contact 54, both located in the stem 24, with similar receiving contacts (not shown) located in the handle 14 where the stem 24 connects when the two parts are securely connected. The stem 24 is relatively hollow so that it can contain the necessary wires and electronic components to achieve vibration. The stem 24 can be manufactured as separate parts to be assembled together, as shown in FIG. 12.

FIGS. 1-3 show the handle 14, which is a unique shape and size compared to traditional toothbrushes. Having a larger handle 14 helps with dexterity for many children and adults with disabilities. The handle 14 also will have a pleasing texture 56 for sensory stimulation and overall experience.

Larger handles 14 have been shown to benefit users with lower grip strength, tremors, and poor motor function. To obtain these benefits, the specific size of the handle is not specified as the required size of the handle changes based on the size of the user's hands. However, the handle 14 should fit in the hand with the relative ergonomics of a tennis ball as opposed to a standard plastic toothbrush, and a round, bulbous shape is shown to be easier to grip than a thin, cylindrical shape.

The handle 14 will be composed of two parts for manufacturing and assembly purposes, and comprise both a hard handle section 58 and the soft texture section 56. A hard substrate 58 will be used to provide structure to the toothbrush 10 as a whole and protect and house the electronics 60 inside. A soft overmolded outer portion 56 will provide comfort and texture with a soft-touch plastic. In the preferred embodiment, an overmolded plastic will also have a ribbed texture 56 on the handle 14 to add additional positive stimulation. This arrangement received very positive responses in user testing sessions, which indicated that having features to pick at or fidget with provided an outlet for sensory needs and kept users with cognitive disabilities focused on the task.

The handle 14 will also have a power button cavity 62 for the power button 64, which will be made of the same soft touch plastic as the overmolding to make the button easy for most users to operate.

In order to more effectively clean teeth, the present disclosure describes incorporating vibrations of various types. Two frequencies of vibrations have been shown to clean teeth more effectively than manual brushing: sonic vibrations and ultrasonic vibrations.

Sonic vibrations are propagated through the stem 24 of the toothbrush, and move the stem 24 and brush head 16 relative to the body (handle) 14 of the toothbrush device 10. These oscillations are of a sufficient amplitude to sweep the bristles of the brush back and forth to facilitate cleaning teeth 32 through the generated scrubbing motion. Sonic vibrations are vibrations at a frequency between ~20 Hz and 20 kHz.

Ultrasonic vibrations are of a much smaller amplitude that is not appreciable to human senses, but causes the bacteria chains that create plaque buildup to fall apart and fall off the teeth 32. These ultrasonic vibrations are characterized by a frequency equal to or higher than 20 kHz. Due to this smaller amplitude, these vibrations should originate from the brush head 16 of the toothbrush device 10, near where contact is made between the bristles 18 and the user's teeth 32. Both Sonic and ultrasonic vibrations can be incorporated into the toothbrush device 10, or one or the other, or neither.

The brush head 16 disclosed herein could work with either of these two types of vibrations. Sonic vibrations could originate from an eccentric motor or magnetic oscillation device (not shown) that causes the stem 24 and bristles 18 to move in the way specified above. Ultrasonic vibrations could originate from a piezoelectric transducer and amplifier unit (not shown) capable of generating the necessary high frequencies. Ultrasonic vibrations in the brush head 16 of the toothbrush device 10 are advantageous, since they provide the benefits of vibration to the teeth 32 without the tactile sensation of vibration in the user's hand.

Other embedded electronics could include a rechargeable or replaceable battery 66, sensors 68 and signaling technology 70 to provide feedback to the user. Additionally, connectivity technology can be implemented to give the toothbrush 10 further functionality. A rechargeable battery 66 could be charged through induction coils, contact points, a connector, or other means of supplying power to the device as known by one having ordinary skill in the art.

Sensors 68 could track the motion of the brush through the use of gyroscopes, position sensors, or other technology. These sensors can be combined with signaling elements such as lights, sounds, or external data transfers to give user feedback on their technique and effectiveness. An external connection through Bluetooth, WI-FI, or other means would allow this data to be processed at a higher fidelity through connection to a smartphone, tablet, or computer. In turn, the connected device could be configured to give specific feedback to the user that is tailored to their specific needs. Additionally, control over vibration intensity could be incorporated into the toothbrush 10, through either a connected device, or a control on the body 14 of the toothbrush 10 so that users could adjust the amount of vibration present to a comfortable level.

The method of manufacture and assembly incorporates that the majority of the electronic components 60 attach to a separate housing 72, which is sealed inside the toothbrush handle 14 during the manufacturing process. The method of assembly is as follows: the majority of the electronic components attach to or are incorporated into an electronics housing 72, thereby creating an electronics subassembly 74.

The housing unit 72 will be an injection molded plastic part that has a designated space for each part of the electronics 60 in the subassembly 74. The electronics 60 includes one or more of a rechargeable battery 66, a PCB 76, and metal connection contacts 78.

The housing unit 72 fastens to the interior electronics cavity 84 of the toothbrush handle 14, and in the preferred embodiment, the handle upper piece 80. Screws 86 are utilized on the bottom of the toothbrush device 10 for holding the housing unit 72, although there are numerous ways to accomplish this feature as understood by one having ordinary skill in the art. The handle lower piece 82 of the toothbrush handle 14 fits into the upper portion (lip) 80 after the housing 72 has been assembled. The handle upper piece 80 and the handle lower piece 82 are overmolded with an elastomer 56, which seals the internals of the toothbrush 10 from water and other external environmental factors. Once the toothbrush 10 is sealed, users will not be able to access any of the electronics 60 inside the handle 14.

As a non-limiting example, FIG. 13 shows a block diagram view of an exemplary electric toothbrush device 10 for improving performance by providing monitoring toothbrush usage and providing adjustment of brushing parameters for different user mouth configurations, such as large, medium and small, braces, missing teeth, among others when brushing one's teeth. The electric toothbrush device 10 has the capability to independently select discrete values for each user's mouth so that separate settings can be set for optimal use.

Each toothbrush device 10 of the toothbrush system 100 utilizes a toothbrush server 102, a toothbrush database 104, a toothbrush application programming interface ("API") 106, and a system user access 108. The system user access 108 is where users and programmers can access the toothbrush system 100 for monitoring and upgrading the software, as necessary, among other functions. The system user access 108 of the toothbrush system 100 can be accomplished at the location of the toothbrush device 10 or remotely depending on the user's needs.

The present disclosure will be described with reference to embodiments in which the toothbrush system 100 uses information from one or more brushing sessions to optimize future brushing sessions. The user's access to the toothbrush system 100 is through connection to the toothbrush API 106. It should be understood, however, that the present disclosure is not limited to the preferred embodiment detailed herein, rather, the system, methods and functionality illustrated and described herein may be incorporated in other ways and still fall under the scope of the present invention.

As an example of the above, a user may use one application program ("app") on a smart phone to access information about the toothbrush device 10 and to manually control the toothbrush device 10, and a separate programmer may use an app to upgrade the system software. Accordingly, the users of the toothbrush system 100 may access the toothbrush API 106 through the toothbrush server 102 or through the system user access 108.

The toothbrush system 100 (which may be referred to herein simply as "the system 100") may include and provide a graphical user interface (GUI) having a number of features described herein. Portions, or all, of the GUI may be provided by the toothbrush server 102, in an embodiment. Accordingly, in an embodiment, the toothbrush server 102 may be configured to perform one or more operations, methods, etc., described herein that enable various control, calculations and determinations for the system 100.

The toothbrush server 102 may be configured to perform a number of functions to assist toothbrush system 100 users in their decisions. For example, the toothbrush server 102 may be configured to provide optimal pumping session parameters, based on previous session data.

The routines, programs and protocols may be obtained from the toothbrush server 102, in an embodiment, from the toothbrush API 106 and/or from the user access 108. The toothbrush system 100 can be used to configure the toothbrush device 10 either automatically or programmatically as described herein, or the user can configure the toothbrush device 10 manually as needed through the user access 108 and the API 106.

The toothbrush server 102 may be further configured to store information or data and to retrieve that information or data from the toothbrush database 104. Data stored in the toothbrush database 104 may include previous settings and session information for the user, including previous toothbrush device 10 configurations based on that data.

The toothbrush database 104 may be or may include one or more data repositories including, but not limited to, one or more databases and database types as well as data storage that may not necessarily be colloquially referred to as a "database." The toothbrush database 104 may be configured to store the information or data described herein, and programs that may be performed through the toothbrush system 100, along with similar information related to the needs of the toothbrush system 100.

The toothbrush server 102 may be in electronic communication with the toothbrush system 100 to obtain and deliver updated information, programs and routines, and other information, in an embodiment. Further, the toothbrush server 102 may be a single server or multiple servers acting in a redundant or additive capacity, and may be located in remotely from or in close proximity to the toothbrush system 100 or the particular toothbrush device 10.

The toothbrush server 102 and the toothbrush device 10 will include separate processors 110 and memories 112. The processor 110 may be any appropriate processing device, and the memory 112 may be any volatile or non-volatile computer-readable memory. The memory 112 may be configured to store instructions that embody one or more steps, methods, processes, and functions of the toothbrush server 102 described herein. The processor 110 may be configured to execute those instructions to perform one or more of the same steps, methods, processes, and functions.

Additionally, the processor 110 may be coupled to the toothbrush device 10 for providing optimal toothbrush settings. The toothbrush server 102 may be or may include a personal computer or mobile device (e.g., tablet, smartphone), in an embodiment.

Instead of, or in addition to, a processor 110 and memory 112, the toothbrush server 102 and the toothbrush device 10 may include a programmable logic device (PLD), application-specific integrated circuit (ASIC), or other suitable processing device (not shown).

The programs and information described herein may be provided, in an embodiment, by the toothbrush server 102 (e.g., on a software-as-a-service (SaaS) basis). Storage and retrieval of data displayed in the toothbrush system 100, and calculations performed by or under the system 100 may be performed by the toothbrush server 102.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment," or "in an embodiment", or the like, in places throughout the specification are not necessarily all referring to the same embodiment.

Further, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation given that such combination is not illogical or non-functional. Although numerous embodiments of this disclosure have been described above with a certain degree of particularity, those skilled in the art could make numerous alterations to the disclosed embodiments without departing from the spirit or scope of this disclosure.

All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the any aspect of the disclosure.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the present disclosure as defined herein in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A pivoting brush head toothbrush utilizing a restorative force for facilitating the brushing of each of a user's teeth, comprising:

a. a toothbrush head assembly, said toothbrush head assembly comprising a brush head and a stem, said brush head containing a bristle assembly and a pivoting assembly, said bristle assembly coupled to said pivoting assembly and comprising a plurality of bristles, said plurality of bristles positioned to make contact with at least one side of said each of said user's teeth, said pivoting assembly allowing said brush head to rotate from a neutral position when a force is applied thereby generating said restorative force, said restorative force assisting to return said brush head back to said neutral position when said force is removed, said brush head configured to be attached to a first end of said stem;

b. a toothbrush handle, said toothbrush handle comprising a sensor, said sensor counting number of times said brush head rotates from said neutral position when the force is applied, said toothbrush handle accepting and supporting a second end of said stem of said toothbrush head assembly;

such that when said toothbrush head assembly is accepted and supported by said toothbrush handle, said brush head is in said neutral position, the user can then brush said each of said user's teeth, wherein as said user can generate a movement of the brush head and guide the brush head over said each of said user's teeth, allowing the pivoting assembly to pivot and said brush head to turn and rotate thereby allowing said plurality of bristles to remain at an optimal angle with respect to said each of said user's teeth thereby generating said restorative force, increasing a value in said counter, based on said movement of the brush head, thereby creating a tendency for said brush head to return back to said neutral position.

2. The pivoting brush head toothbrush utilizing a restorative force for facilitating the brushing of a user's teeth in claim 1, wherein said pivoting assembly comprises a peg, a first leaf spring and a second leaf spring, said first leaf spring and said second leaf spring in contact with said peg, said peg being connected to said bristle assembly such that when said user generates a movement of the brush head and guides the brush head over said each of said user's teeth, allowing the pivoting assembly to turn and rotate the brush head, the peg will rotate in relation to said first leaf spring and said second leaf spring, thereby creating said restorative force.

3. The pivoting brush head toothbrush utilizing a restorative force for facilitating the brushing of a user's teeth in claim 1, wherein said pivoting assembly comprises one or more rubber bands, said one or more rubber bands being connected to said bristle assembly such that when said user generates a movement of the brush head and guides the brush head over said each of said user's teeth, allowing the pivoting assembly to turn and rotate the brush head, said one or more rubber bands will create said restorative force.

4. The pivoting brush head toothbrush utilizing a restorative force for facilitating the brushing of a user's teeth in claim 1, wherein said pivoting assembly comprises one or more torsion springs, said one or more torsion springs being connected to said bristle assembly such that when said user generates a movement of the brush head and guides the brush head over said each of said user's teeth, allowing the pivoting assembly to turn and rotate the brush head, said one or more torsion springs will create said restorative force.

5. The pivoting brush head toothbrush utilizing a restorative force for facilitating the brushing of a user's teeth in claim 1, wherein said plurality of bristles comprises three sets of bristles that will concurrently contact said each of said user's teeth, a first set, a second set and a third set, said first set will contact an outside of said each of said user's teeth, said second set will contact an inside of said each of said user's teeth, said third set will contact a top side of said each of said user's teeth, said first set and said second set to be configured to contact a gingival margin of said each of said user's teeth at an effective angle.

6. The pivoting brush head toothbrush utilizing a restorative force for facilitating the brushing of a user's teeth in claim 5, wherein said effective angle is approximately 45 degrees.

7. The pivoting brush head toothbrush utilizing a restorative force for facilitating the brushing of a user's teeth in claim 1, wherein said toothbrush head assembly and said toothbrush handle are an integral unit.

8. The pivoting brush head toothbrush utilizing a restorative force for facilitating the brushing of a user's teeth in claim 1, further comprising an electronics subassembly, said electronics subassembly comprising electronics, a printed circuit board, a battery, and electrical contacts, said electronics subassembly being capable of generating vibrations and being configured to be securely located in a hollow portion of said toothbrush handle, said electronics subassembly being connected to said plurality of bristles such that said electronics subassembly generates vibrations to and through the plurality of bristles.

9. The pivoting brush head toothbrush utilizing a restorative force for facilitating the brushing of a user's teeth in claim 8, wherein said vibrations to and through the plurality of bristles are ultrasonic vibrations.

10. The pivoting brush head toothbrush utilizing a restorative force for facilitating the brushing of a user's teeth in claim 1, wherein said pivoting assembly comprises an electronic pivoting assembly, said electronic pivoting assembly generates a restorative force electronically when said user generates a movement of the brush head and guides the brush head over said each of said user's teeth.

11. A method for facilitating the brushing of a user's teeth using a pivoting brush head toothbrush utilizing a restorative force comprising a toothbrush head assembly and a toothbrush handle, said toothbrush head assembly comprising a brush head, said brush head containing a bristle assembly and a pivoting assembly, said bristle assembly coupled to said pivoting assembly and comprising a plurality of bristles, said plurality of bristles configured and positioned to make contact with each of said user's teeth, said pivoting assembly configured to allow said brush head to turn and rotate in relation to the handle thereby generating said restorative force, said brush head configured to be attached to a first end of a stem, and said toothbrush handle comprising a sensor for counting the movement of the brush head and accepting and supporting a second end of said stem of said toothbrush head assembly, steps comprising:

a) orienting said brush head to a neutral position;

b) allowing said user to generate a movement of the brush head, said movement creating a force;

c) allowing said user to guide the brush head over said each of said user's teeth, thereby turning and rotating said brush head;

d) pivoting the pivoting assembly as the brush head turns and rotates;

e) allowing said plurality of bristles to remain at an optimal angle with respect to said each of said user's teeth;

e) generating a restorative force based on said movement of the brush head;

f) creating a tendency for said brush head to return back to said neutral position when said force is removed;

g) returning said brush head back to said neutral position; and h) counting each time said brush head returns back to said neutral position.

12. The method for facilitating the brushing of a user's teeth using a pivoting brush head toothbrush utilizing a restorative force in claim 11, wherein said pivoting assembly comprises a peg, a first leaf spring and a second leaf spring, said first leaf spring and said second leaf spring in contact with said peg, said peg being connected to said bristle assembly such that when said user generates a movement of the brush head and guides the brush head over said each of said user's teeth, allowing the pivoting assembly to turn and rotate the brush head, the peg will rotate in relation to said first leaf spring and said second leaf spring, thereby creating said restorative force.

13. The method for facilitating the brushing of a user's teeth using a pivoting brush head toothbrush utilizing a restorative force in claim 11, wherein said pivoting assembly comprises one or more rubber bands, said one or more rubber bands being connected to said bristle assembly such that when said user generates a movement of the brush head and guides the brush head over said each of said user's teeth, allowing the pivoting assembly to turn and rotate the brush head, said one or more rubber bands will create said restorative force.

14. The method for facilitating the brushing of a user's teeth using a pivoting brush head toothbrush utilizing a restorative force in claim 11, wherein said pivoting assembly comprises one or more torsion springs, said one or more torsion springs being connected to said bristle assembly such that when said user generates a movement of the brush head and guides the brush head over said each of said user's teeth, allowing the pivoting assembly to turn and rotate the brush head, said one or more torsion springs will create said restorative force.

15. The method for facilitating the brushing of a user's teeth using a pivoting brush head toothbrush utilizing a restorative force in claim 11, wherein said plurality of bristles comprises three sets of bristles that will concurrently contact said each of said user's teeth, a first set, a second set and a third set, said first set will contact an outside of said each of said user's teeth, said second set will contact a top of said each of said user's teeth, said third set will contact an inside of said each of said user's teeth, said first set and said third set to be configured to contact a gingival margin of said each of said user's teeth at an effective angle.

16. The method for facilitating the brushing of a user's teeth using a pivoting brush head toothbrush utilizing a restorative force in claim 11, wherein said effective angle is approximately 45 degrees.

17. The method for facilitating the brushing of a user's teeth using a pivoting brush head toothbrush utilizing a restorative force in claim 11, further comprising an electronics subassembly, said electronics subassembly comprising electronics, a printed circuit board, a battery, and electrical contacts, said electronics subassembly being capable of generating vibrations and being configured to be securely located in a hollow portion of said toothbrush handle, said electronics subassembly being connected to said plurality of bristles such that said electronics subassembly generates vibrations to and through the plurality of bristles.

18. The method for facilitating the brushing of a user's teeth using a pivoting brush head toothbrush utilizing a restorative force in claim 11, in which the step of counting each time said brush head returns back to said neutral position is done electronically.

19. The method for facilitating the brushing of a user's teeth using a pivoting brush head toothbrush utilizing a restorative force in claim 11, wherein said pivoting assembly comprises an electronic pivoting assembly, said electronic pivoting assembly generates a restorative force electronically when said user generates a movement of the brush head and guides the brush head over said each of said user's teeth.

* * * * *